(12) United States Patent

Braun et al.

(10) Patent No.: US 12,604,874 B2

(45) Date of Patent: Apr. 21, 2026

(54) BOWFISHING REEL WITH REEL MOUNT SUPPORTING LOCKING GUIDE ARM

(71) Applicant: AMS, LLC, Stratford, WI (US)

(72) Inventors: Jeff Braun, Stratford, WI (US); Tim Morines, Abbotsford, WI (US)

(73) Assignee: AMS, LLC, Stratford, WI (US)

( * ) Notice: Subject to any disclaimer, the term of this patent is extended or adjusted under 35 U.S.C. 154(b) by 387 days.

(21) Appl. No.: 18/135,979

(22) Filed: Apr. 18, 2023

(65) Prior Publication Data

US 2023/0329205 A1     Oct. 19, 2023

Related U.S. Application Data

(60) Provisional application No. 63/332,428, filed on Apr. 19, 2022.

(51) Int. Cl.
*A01K 89/01* (2006.01)
*A01K 89/00* (2006.01)
*F41B 5/14* (2006.01)

(52) U.S. Cl.
CPC ...... *A01K 89/006* (2013.01); *A01K 89/01081* (2015.05); *F41B 5/1488* (2013.01)

(58) Field of Classification Search
CPC .. F41B 5/1488; A01K 89/01029; A01K 81/00
See application file for complete search history.

(56) References Cited

U.S. PATENT DOCUMENTS

| | | | | |
|---|---|---|---|---|
| 4,674,471 A | * | 6/1987 | Lance | A01K 81/00 43/19 |
| 2015/0354915 A1 | * | 12/2015 | Woods, Jr. | A01K 91/02 124/86 |
| 2017/0295768 A1 | * | 10/2017 | Noble | F41B 5/1488 |
| 2017/0367310 A1 | * | 12/2017 | Braun | A01K 89/0102 |
| 2019/0059344 A1 | * | 2/2019 | Braun | A01K 89/081 |
| 2019/0063866 A1 | * | 2/2019 | Braun | A01K 89/006 |

FOREIGN PATENT DOCUMENTS

| | | | | | |
|---|---|---|---|---|---|
| GB | | 820874 A | * | 9/1959 | A01K 89/01029 |

* cited by examiner

*Primary Examiner* — Emmanuel M Marcelo
(74) *Attorney, Agent, or Firm* — Wong Meyer Smith & McConnell

(57) ABSTRACT

A reel and mounting fixture suitable for bowfishing and the like provides a reel with a cowling covering a reel with a wide opening to reduce frictional restraint on high-speed paying out of the line with the flight of the arrow and a guide arm supported by the mounting fixture to minimize line diversion and hence friction during line payout while absorbing forces when the line is retracted permitting use of a lighter cowling design without loss of strength. The guide arm is fixed to the mounting fixture using a notched guide arm engaging with a lever of the mounting fixture.

20 Claims, 7 Drawing Sheets

BOWFISHING REEL WITH REEL MOUNT SUPPORTING LOCKING GUIDE ARM

CROSS REFERENCE TO RELATED APPLICATIONS

This application claims the benefit of U.S. Provisional Patent Application No. 63/332,428, filed Apr. 19, 2022, which is incorporated by reference herein in its entirety.

BACKGROUND OF THE INVENTION

The present invention relates to a fishing reel for rapid payout of fishing line and more particularly to a fishing reel that provides payout of the fishing line through a torque rod, for example, as desired when the fishing reel is used for bowfishing.

In bowfishing, an arrow is fitted with a lightweight but sturdy line which may pay out behind the arrow when the arrow is shot from a bow. The line allows the arrow and/or arrow and fish to be retrieved after the shot.

It is important that the line be stored without tangling before release of the arrow and yet be able to pay out rapidly with little resistance when the arrow is released. Conventional reels which rotate to wind or unwind line present substantial rotational inertia that can interfere with free flight of the arrow.

These problems of line storage and release are addressed in a novel bowfishing reel described in U.S. Pat. No. 4,383,516, assigned to the assignee of the present invention, in which the line is loosely coiled in a bottle. After the line is pulled from the bottle by the arrow, opposed rubber rollers at the mouth of the bottle clamp together about the line and push it into the bottle under the urging of a geared crank handle. The line is stored without winding in a loose mass within the bottle that nevertheless resists tangling.

An alternative to the above design can be found in a novel bowfishing reel described in U.S. Pat. Nos. 10,499,622 and 10,782,088, assigned to the assignee of the present invention, in which the axis of the spool about which the line is wound is parallel to the direction that the line pays out after arrow release. As the line pays out, the line slips over the edge of the reel unwinding without rotation of the reel or the need to overcome a corresponding rotational inertia of the reel. A cowling fits over the reel and provides a central aperture for corralling the line along a center line of the reel when it is wound back on the reel.

SUMMARY OF THE INVENTION

The present inventors have recognized that in bowfishing, deflection of the line, as it pays over the edge of the reel and passes through the cowling opening to follow a high-speed arrow, can substantially impede the line reducing arrow distance and velocity. To remedy this problem, a guide arm works in tandem with the wide aperture to prevent contact between the line and aperture to absorb the stress and forces of the line from the reel. The guide arm may be adjustably extended in front of the aperture by substantial distance to limit the deflection angles of the line around the reel guide arm aperture, further reducing line friction.

It is thus a feature of at least one embodiment of the invention to eliminate contact between the cowling and the line when the line is under tension reducing unnecessary friction on the line and allowing a lighter cowling design.

Specifically, the present invention in one embodiment provides a fishing line reel providing rapid line payout including a frame adapted for attachment to a bow and a line spool rotatable with respect to the frame about a first axis to wind fishing line on the line spool around the first axis. The line spool provides a front rim extending radially about the first axis and the fishing line passes over the front rim during payout of the fishing line. A winder having a crank arm rotatable by a user may rotate the line spool around the first axis, and a cowling may be supported by the frame to surround the line spool, the cowling having an opening at a first end to allow payout of the fishing line along the first axis. The reel may further include a guide arm supported by the frame and having a portion extending beyond the opening of the cowling along the first axis to receive the fishing line therethrough guiding the fishing line to prevent contact between the opening and the fishing line when the fishing line is in tension. The guide arm is notched at discrete locations to engage with a corresponding lever of the frame locking a longitudinal position of the guide arm along the first axis.

It is thus a feature of at least one embodiment of the invention to provide rotational and longitudinal positional locking of the guide arm without the use of tools.

The notches of the guide arm may be wave shaped.

It is thus a feature of at least one embodiment of the invention to allow for secure engagement of the locking lever and the guide arm.

The notches may be on at least a lower side of the guide arm opposite an upward bend of the guide arm extending beyond the opening of the cowling.

It is thus a feature of at least one embodiment of the invention to allow for easy single handed or single finger locking of the locking lever by the user.

The corresponding lever may extend downwardly from the frame perpendicular to the first axis in a first position and extends along the first axis in a second position locking the longitudinal position of the guide arm along the first axis.

It is thus a feature of at least one embodiment of the invention to allow the locking lever to be used with a picatinny rail on a top side of the mounting fixture.

The corresponding lever may have a surface disengaged with the notches of the guide arm in a first position and engaged with the notches of the guide arm in a second position locking the longitudinal position of the guide arm along the first axis.

It is thus a feature of at least one embodiment of the invention to allow for engagement of the locking lever with the guide arm via an oblong or elongate shape of the rotating end of the locking lever.

The surface may be a concave surface corresponding to a convex shape of the notches of the guide arm.

It is thus a feature of at least one embodiment of the invention to allow for a first surface of the locking lever to extend into the notches of the guide arm while a second surface adjacent and perpendicular to the first surface does not extend into the notches of the guide arm.

The guide arm may be lockable at multiple longitudinal positions along the first axis to be displaced at multiple longitudinal positions away from the cowling.

It is thus a feature of at least one embodiment of the invention to allow the user to adjust a longitudinal position of the guide arm and to lock the position of the guide arm.

The notches may be in a continuous repeating pattern along a length of the guide arm.

It is thus a feature of at least one embodiment of the invention to provide closely spaced and discrete locations to lock the guide arm along multiple positions along the longitudinal axis.

The guide arm may receive the fishing line through an aperture in a distal end of the guide arm removed from the frame and aligned with the first axis and the aperture is adjustably removed from the frame by a distance between 1 inch and 3 inches.

It is thus a feature of at least one embodiment of the invention to allow the guide arm aperture to be adjusted to different longitudinal positions to change the deflection angle.

The guide arm may be positioned so that the fishing line in tension is diverted by the guide arm by a deflection angle with respect to the first axis of greater than 135 degrees and desirably greater than 150 degrees.

It is thus a feature of at least one embodiment of the invention to reduce contact normal forces and thus friction by avoiding sharp deflection angles and increasing the distance of the guide arm from the front of the reel.

The guide arm may attach to the frame without direct contact with the cowling.

It is thus a feature of at least one embodiment of the invention to remove forces from the cowling allowing a lighter weight cowling design.

The guide arm may receive the fishing line through an aperture in a distal end of the guide arm removed from the frame and aligned with the first axis.

It is thus a feature of at least one embodiment of the invention to center the fishing line with the rotation axis of the reel for improved line payout and winding.

The aperture may be removed from the frame by a distance of at least 1 inch.

It is thus a feature of at least one embodiment of the invention to reduce normal force on the line by increasing the distance of between the line guide and reel.

Specifically, the present invention in one embodiment provides a mounting assembly for attaching a fishing reel to a bow including a mounting fixture providing a first axial bore at a first end and a mounting surface adapted to receive the fishing reel providing an opening at a front end to allow pay out of fishing line forwardly of the opening; a bar adapted to attach to the bow to extend from the bow along an extension axis to be received within the first axial bore; and a guide arm supported by the mounting fixture, the guide arm having a proximal end extending forwardly from the mounting fixture generally parallel to the extension axis and a distal end extending forwardly from the mounting fixture and bent away from the extension axis to be displaced away from the mounting fixture and aligned with the opening of the fishing reel wherein the guide arm is notched at discrete locations along the guide arm to engage with a corresponding lever of the mounting fixture locking a longitudinal position of the guide arm along the first axis.

The guide arm may include a key receivable within a corresponding keyway of the mounting fixture. The key may be a hex key and the mounting fixture may be a bore with a hexagonal cross section.

Specifically, the present invention in one embodiment provides a guide arm for a fishing reel providing rapid line payout including a guide arm supported by a mounting fixture providing a first axial bore at a first end adapted to receive a bar attaching the bow and a mounting surface adapted to receive the fishing reel providing an opening at a front end to allow pay out of fishing line forwardly of the opening along a payout axis, the guide arm having a proximal end extending forwardly from the mounting fixture generally parallel to the payout axis and a distal end extending forwardly from the mounting fixture and bent away from the extension axis to be displaced away from the mounting fixture and aligned with the opening of the fishing reel wherein the guide arm is notched at discrete locations along the guide arm to engage with the mounting fixture locking a longitudinal position of the guide arm along the first axis.

The guide arm may include a key receivable within a corresponding keyway of the mounting fixture. The key may be a hex key.

The present invention provides a reel with an in-line payout control handle that may be positioned near the user's hand holding the bow for simple direct control of payout tension using the fingers of the bow-holding hand. The handle may extend from a top of the reel housing and is operable by the user to move a line guide from the retracted position to the extended position when the handle moves between a released position and an actuated position. The handle allows a single line of force to connect tension on the fishing line with force on the handle through the user's hand to the bow support region.

It is thus a feature of at least one embodiment of the invention to provide a pivoting lever handle that centers the user's force on the reel at the reel's center of gravity for improved balance when pivoting the lever.

Specifically, the present invention in one embodiment provides a fishing line reel providing rapid line payout including a housing supporting a crank mechanism operable by a user for rotating a first shaft extending along an axis with respect to the housing; a line spool rotatable about the first shaft; a winder attached to rotate with the first shaft and having a line guide for catching a fishing line so that the fishing line winds about the line spool with rotation of the first shaft when the line guide is in an extended position and for freeing the fishing line so that the fishing line does not wind about the line spool with the rotation of the first shaft when the line guide is in a retracted position; a handle extending upwardly from a rear of the housing substantially perpendicular to the axis and operable by the user to move the line guide from the retracted position to the extended position when the handle moves between a released position and an actuated position; and a bias spring biasing the handle mechanism to move the line guide to the released position.

These particular objects and advantages may apply to only some embodiments falling within the claims and thus do not define the scope of the invention.

DETAILED DESCRIPTION OF THE PREFERRED EMBODIMENT

Fishing Line Reel with Lever Action

Figure 1:
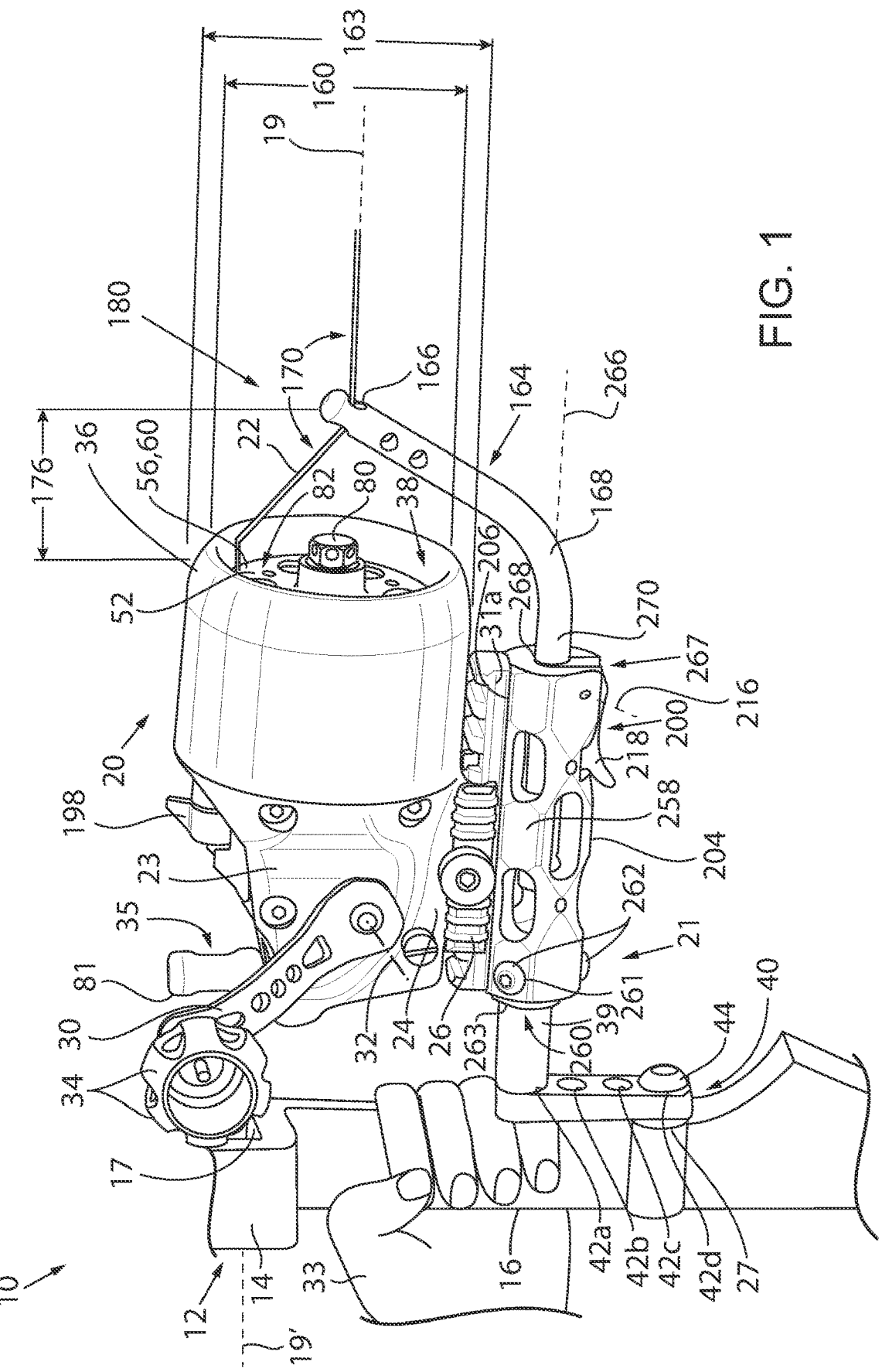
FIG. 1 is a fragmentary perspective view of a bow riser portion of a bow having a reel of the present invention attached thereto by means of an adjustable mounting system and a guide arm installed within the adjustable mounting system.
Figure 2:
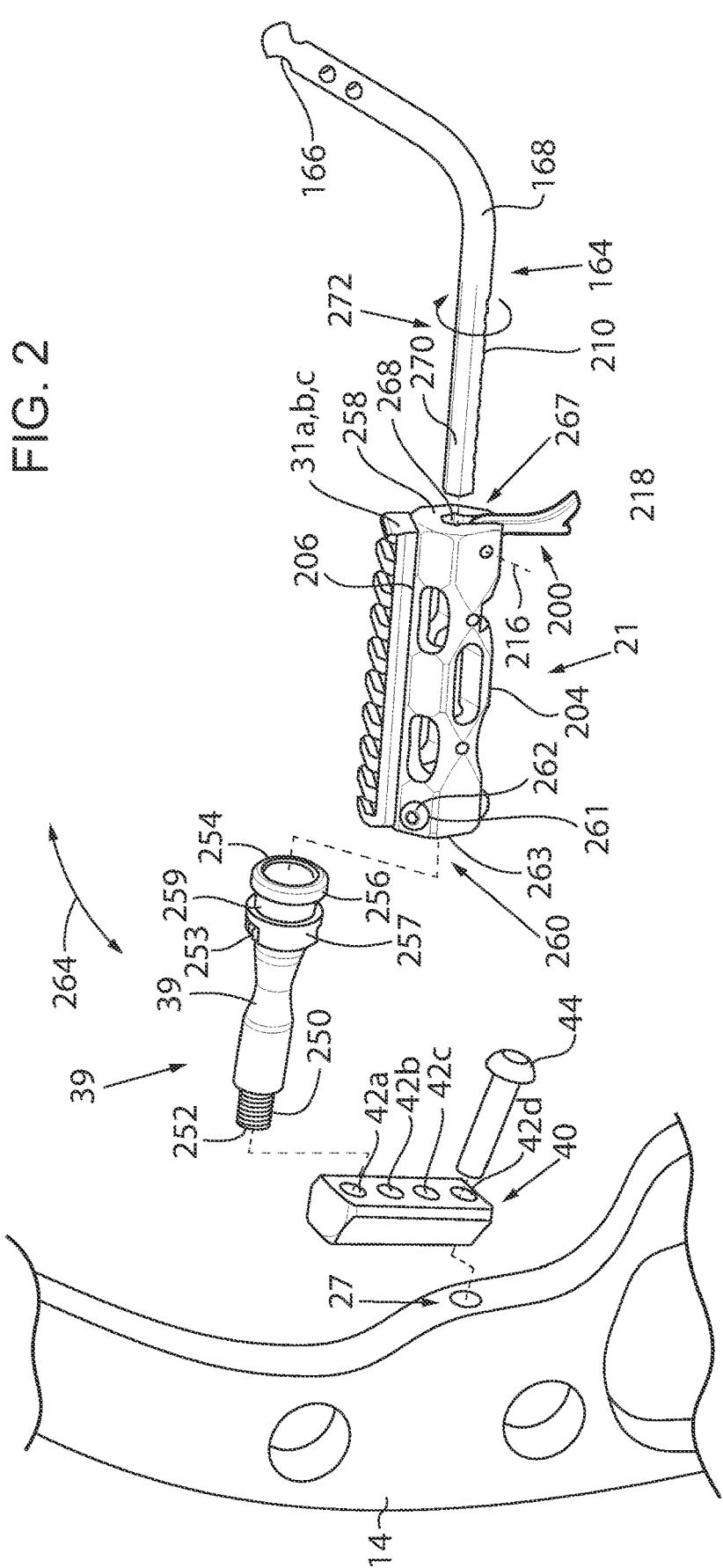
FIG. 2 is a fragmentary exploded perspective view of the bow and adjustable mounting system of FIG. 1 showing the guide arm removed from the adjustable mounting system.

Referring to FIGS. 1 and 2, a bowfishing bow 10 may include a bow frame 12 presenting a bow riser 14 providing a grip 16 for gripping by the bow hand of the user 33. The bow riser 14 may provide an arrow shelf 17 above the grip 16 for supporting an arrow shaft (not shown) before release of the arrow shaft for travel generally along an arrow axis 19'.

A fishing line reel 20 for storing and paying out fishing line 22 may be attached to the bow riser 14 near the grip 16 by means of a mounting fixture 21 to be positioned generally proximate to and in front of the bow riser 14 to provide a payout axis 19 generally parallel to the arrow axis 19'. The fishing line 22 used in this capacity may be, for example, a braided rather than monofilament line, for example, a braided Spectra roughly $\frac{1}{32}$ inches in diameter or smaller ranging from 50-pound test to 200-pound test, that may be readily distinguished from, for example, a fly casting line by its greater strength and substantially greater outer diameter.

The fishing line reel 20 may have a reel housing 23 providing a frame attached to a vertically descending mount 24 attached to lower clamp jaws 26. The lower clamp jaws 26 connect with, e.g., a first picatinny rail 31a on an upper surface of the mounting fixture 21 in the upward facing position and being one of multiple, e.g., three picatinny rails 31a-c of varying height available to be installed on the mounting fixture 21 as will be discussed below. The mounting fixture 21 may be attached to a mounting bar 39 extending forwardly from the riser 14 below the grip 16 and attached to the riser 14 by means of a threaded bore 27 extending therethrough generally parallel to arrow axis 19'. A height adjustment block 40 may be connected to the riser 14 by means of the threaded bore 27 to adjust a height of the mounting bar 39 and the mounting fixture 21 with respect to the grip 16 on the riser 14. The mounting fixture 21 will be discussed in greater detail below.

The reel housing 23 is positioned to allow the fishing line 22 extending along the payout axis 19 parallel to arrow axis 19' to be approximately below but vertically aligned with arrow axis 19'. Ideally the payout axis 19 of the fishing line 22 is roughly centered on the grip 16 significantly limiting torque on the grip 16 when tension is applied to the fishing line 22.

Figure 6:
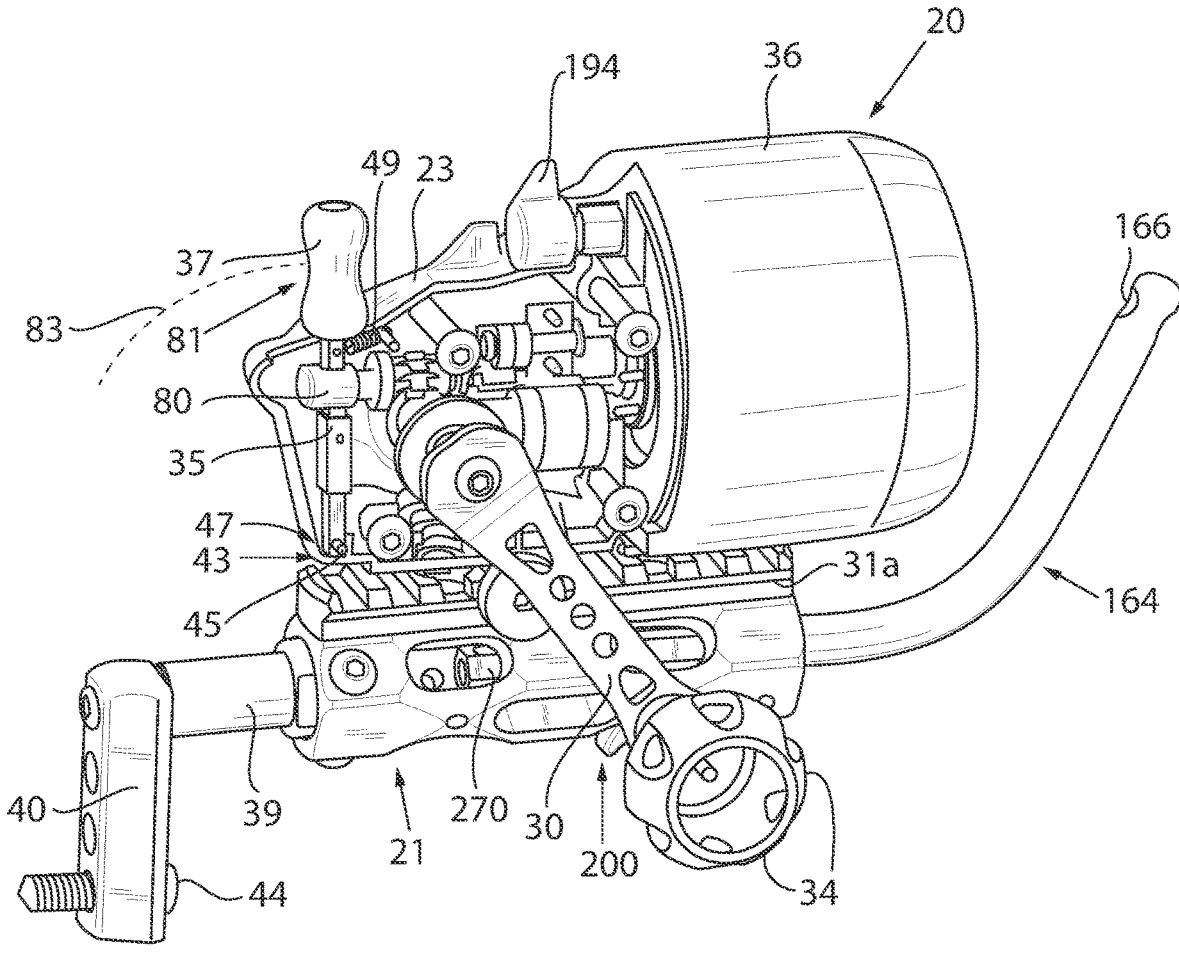
FIG. 6 is a rear perspective view of the reel of FIG. 1 with the housing removed to show the inner gear train.

Referring now to FIG. 6, a spool control lever 35 extends upwardly from the reel housing 23 from an end of a spool shaft 80 (an end of the shaft 80 held within an interior of the housing 23 at a rear of the reel) generally aligned with payout axis 19 and positioned closely above the grip 16 so that the spool control lever 35 may be easily operated by fingers of a hand of the user 33 holding the grip 16. The lever 35 may attach through an opening or slot on the top of the reel housing 23 generally extending perpendicularly (when not operated by the user) to the axis 19'. The position of the lever 35 at the top of the reel housing 23 provides an improved center of gravity to the fishing line reel 20 which allows forces providing movement of the lever 35 by the user to be well balanced about the center of gravity of the reel.

An upper end of the lever 35 may support a handle 37 extending parallel to the lever 35 and perpendicularly (when not operated by the user) to the spool shaft 80 extending through the reel housing 23, the handle 37 further providing a centered indentation 81 to receive one or more fingers of the user 33 on the indentation 81 of the handle 37 to provide for a rearward retraction force. The surface of the indentations 81 may be arcuate for improved comfort and finger centering on the handle 37.

Figure 7:
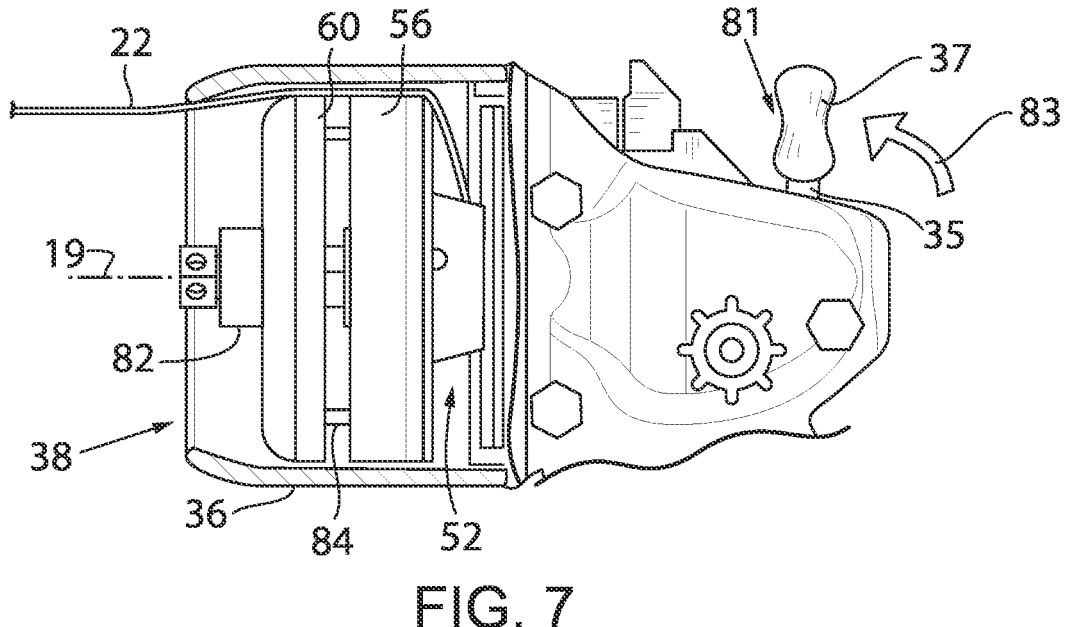
FIG. 7 is a side elevational cross-section of the reel of FIG. 1 showing positioning of the control handle forward in the released position so that the line guide used for winding line around the line spool is retracted and the line spool is free to rotate.
Figure 8:
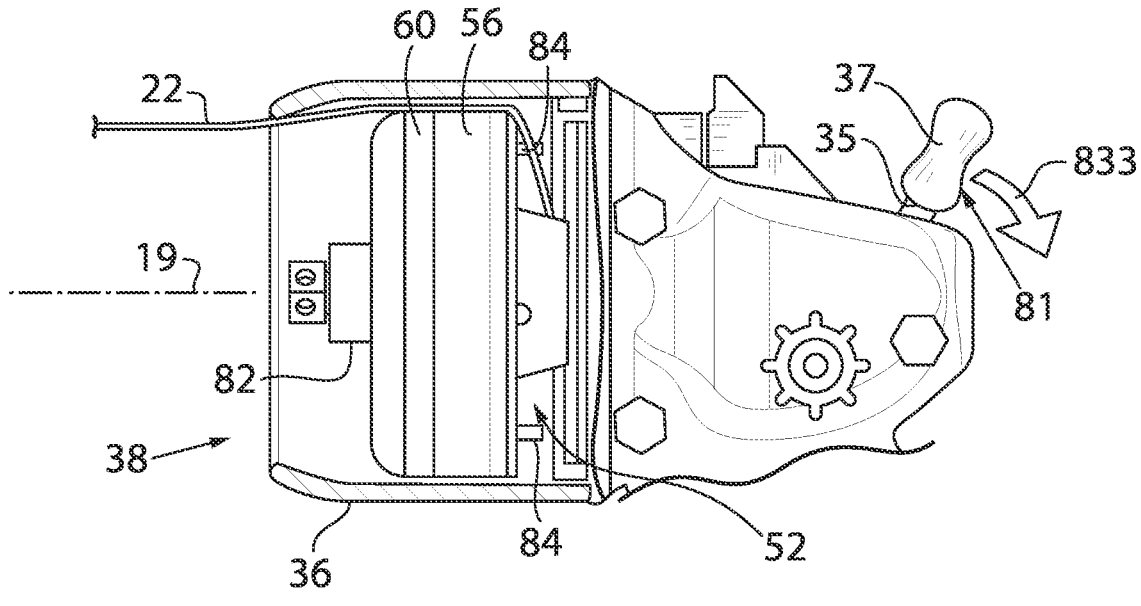
FIG. 8 is a figure similar to that of FIG. 7 showing positioning of the control handle rearward in the actuated position so that the line guide used for winding line around the line spool is extended for engaging the fishing line and the line spool is locked against rotation.

Referring also to FIGS. 7 and 8, the lever 35 may attach to the end of the shaft 80 through a hollow bore 41 in the rear end of the shaft 80 which allows a middle section of the lever 35 to pass through the bore 41 extending through the shaft 80 perpendicular to the shaft 80. The lever 35 may thus slide smoothly through the hollow bore 41 of the shaft 80 with movement of the lever 35 and without interference.

A lower end of the lever 35 is connected to the reel housing 23 by a pivot connection 43 allowing the lever 35 to pivot forwardly and backwardly along an arcuate path 83 about the pivot connection 43. This forward and backward motion of the lever 35 moves the shaft 80 forward and backward along the payout axis 19. The pivot connection 43 may provide a pin hinge providing outwardly extending pins 45, e.g., dowel pins, extending in opposite directions perpendicular to both the lever 35 and shaft 80 and mating with corresponding receiving holes 47 supported by the reel housing 23 and sized to receive the pins 45 to allow rotation of the pins 45 within the receiving holes 47. The receiving holes 47 are aligned along an axis to stabilize rotational movement of the lever 35 forward and backward.

An extension spring 49 having a first end supported by the reel housing 23 and an opposed second end attached to the lever 35 biases the lever 35 forward and serves to move the lever 35 to the forward released position when it is not pulled rearwardly by the user. In the released position, extension spring 49 pulls the lever 35 toward the front end of the reel housing 23. In the retracted position, the user pulls the lever 35 against the forward spring force.

As seen in FIGS. 7 and 8, a front end of the shaft 80 may be attached to an end cap 82 which may press against the front surface of the front fishing line deflector 60 to provide compressive force along axis 19 without constraining the rotation of the front fishing line deflector 60 when the lever 35 is pulled back.

Three line catch pins 84 are embedded in the front fishing line deflector 60 to extend from a rear of the periphery of the front fishing line deflector 60 generally parallel to axis 19 but displaced therefrom at equal angles. The line catch pin 84 may be received within a loose, aligned bore formed in the rear fishing line deflector 56 to slide therethrough. The front fishing line deflector 60 and the rear fishing line deflector 56 may be spring biased apart by multiple springs to provide rapid release as further described below.

When not operated by the user, the control lever 35 will be in an upwardly released position as shown. In the released position, springs separate the rear fishing line deflector 56 from the front fishing line deflector 60 pulling the line catch pins 84 fully within the rear fishing line deflector 56 so that they may not interfere with a sliding of the fishing line 22 around the smooth, radially symmetrical outer peripheries of the line deflectors 56 and 60 during an unspooling operation. Each of the front fishing line deflector 60 and rear fishing line deflector 56 provide substantially smooth circular outer peripheries providing a front rim to a line spool 52 and may allow the fishing line 22 to slide around payout axis 19 when paying off of the fishing line spool 52. In addition, the line spool 52 may freely rotate when the lever 35 is in the upwardly released position. It will be understood therefore that paying out of the fishing line 22 is facilitated by the ability of the fishing line 22 to pass freely around the fishing line deflectors 56 and 60 in an unwrapping process. In addition, the opening of the cowling 36 is greatly expanded substantially reducing the interference between the cowling 36 and the fishing line 22, and in particular, the deflection of the line 22 caused by any incidental contact between the line 22 and the edge of the opening 38 in the cowling 36 such as produces normal, frictional forces of the type described below.

With rearwardly motion of the lever 35 by the user, an extension of the line catch pins 84 from a rear surface of the rear fishing line deflector 56 will catch the fishing line 22 and, with rotation driven by the crank arm 30, wrap the fishing line 22 around the fishing line spool 52 which is now held in a locked position. The single-handled crank arm 30 may extend from a side of the reel housing 23 to be operated by the user to rotate a crankshaft (not shown) about axis 32 perpendicular to payout axis 19. The crank arm 30 may include rotating grips 34 on its end as is generally understood in the art.

An operator knob 198 may be accessible to the user to allow adjustment of a frictional constraint on the rotation of the line spool 52 when it is in the locked position. Control of the tension of the fishing line 22 will be a function of frictional restraint of the line spool 52 and prevention of rotation of the rear and front fishing line deflectors 56, 60 the latter effected through the user control of the crank arm 30.

In normal use, a reel cowling 36 may attach to the reel housing 23 to protect and cover an internal winding mechanism of the line spool 52 and to provide a frontward opening 38 through which the fishing line 22 exits generally along the payout axis 19.

Referring again to FIGS. 1 and 2, during use, an arrow slide on an arrow (not shown but as depicted in U.S. Pat. No. 6,517,453 hereby incorporated by reference) will be attached to a free end of the fishing line 22 and engage with the bowstring, for example, held by the user's right hand (assuming a right-handed user and bow) while the user's left hand holds the grip 16. The user's fingers will be free of the lever 35 and thus when the arrow is released the fishing line 22 will be able to pay out at rapid speed. For retrieval of the arrow and fishing line 22, the user may simply extend the fingers of the hand of the user 33 holding the bow to engage the lever 35 and pull it back to catch the fishing line 22. The user's right hand will then be able to operate the crank arm 30. By simultaneous control of the crank arm 30 and the lever 35 tensioning, retraction of the fishing line may be flexibly controlled.

The fishing line reel 20 described above may be as depicted and described in U.S. Pat. Nos. 10,499,622 and 10,782,088 assigned to assignee of the present invention, both of which are hereby incorporated by reference.

Mount with Torque Rod Stabilizing Lever

Figure 3:
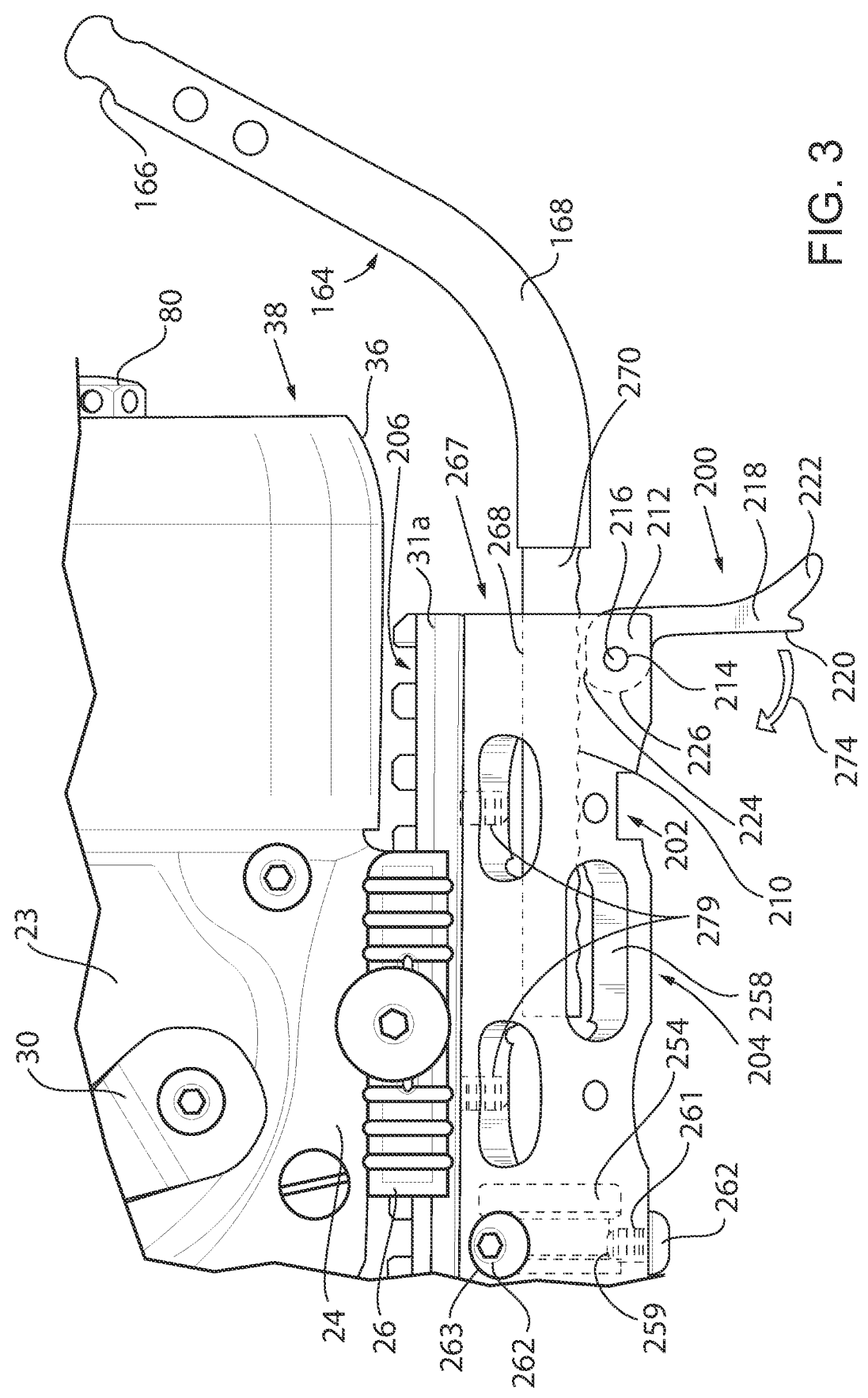
FIG. 3 is a side elevational phantom view of the adjustable mounting system of FIG. 1 showing positioning of the guide arm within the guide arm aperture and the locking lever extending downwardly in the release position so that the guide arm can be freely adjusted along the guide arm aperture.
Figure 4:
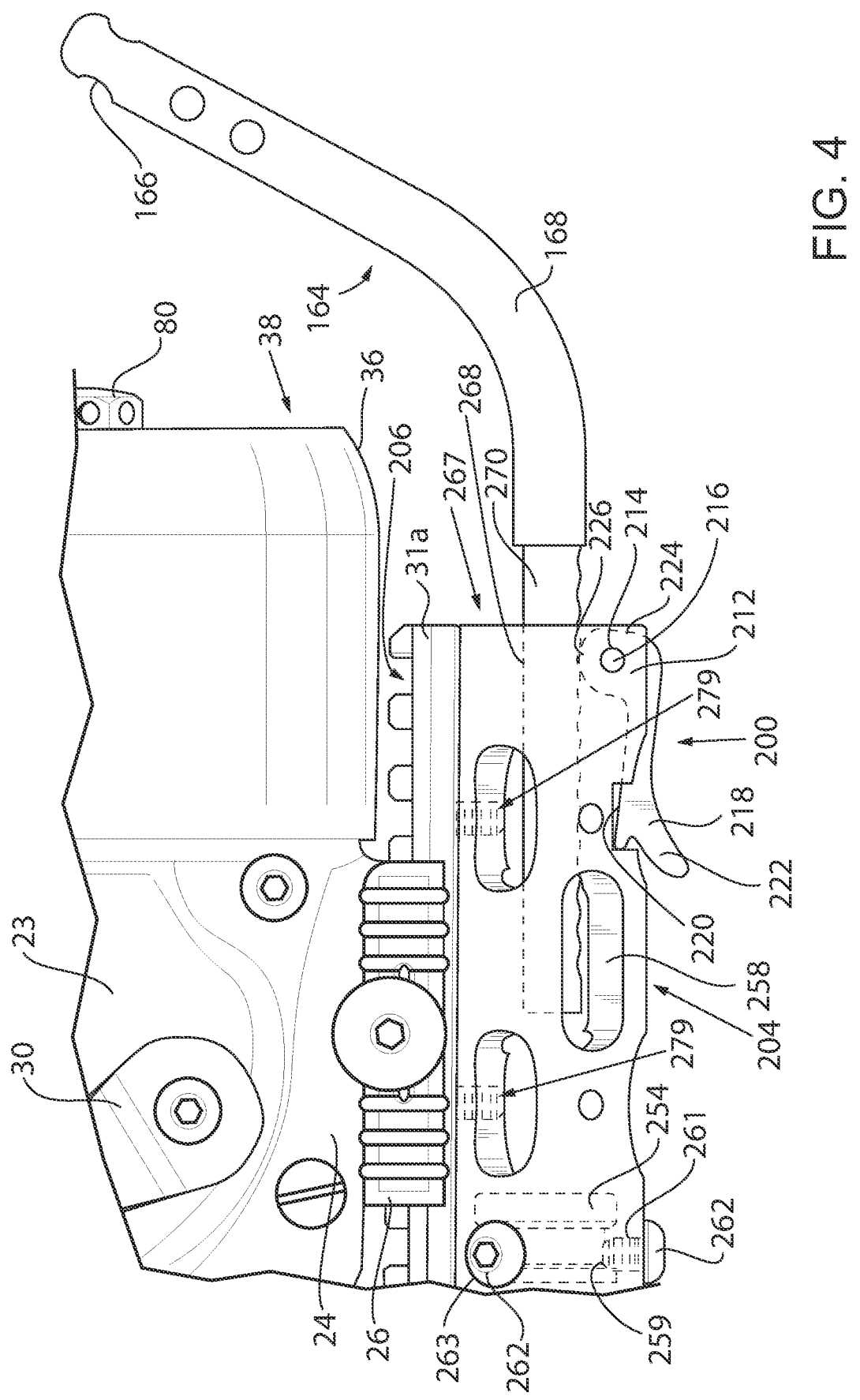
FIG. 4 is a figure similar to that of FIG. 3 showing positioning of the locking lever extending upwardly in the actuated position so that the guide arm is locked in position along the guide arm aperture so that the position of the guide arm is fixed.

Referring now specifically to FIG. 2, but as further depicted in FIGS. 3 and 4, the mounting fixture 21 may be attached to the mounting bar 39 extending forwardly from the riser 14 and attached to the riser 14 by means of the threaded bore 27 extending through the riser 14. A height adjustment block 40 may be interposed between the threaded bore 27 of the riser 14 and the threaded cylindrical end 250 of the mounting bar 39 to adjust the height of the mounting fixture 21 with respect to the riser 14. The height adjustment block 40 provides multiple vertically spaced threaded bores 42, for example, four bores 42a-42d permitting the attachment of the threaded end of the mounting bar 39 into a top threaded bore 42a and an attachment screw 44 through a lower vertically spaced threaded bore 42d and into the threaded bore 27 to raise the mounting bar 39 and the mounting fixture 21 above the threaded bore 27 of the riser 14.

The mounting bar 39 may include a threaded cylindrical end 250 received by the corresponding threads of the threaded bore 42a of the height adjustment block 40 at a first end 252 and has a second end 254 with a cylindrical bushing 256 axially aligned with an axis of the cylindrical end 250 and received by a correspondingly sized axially aligned cylindrical threaded bore 27 in the mounting fixture 21. The bushing 256 may be separated from a similarly sized collar 257 spaced inwardly along the axis from the second end 254 and second bushing 256 of the mounting bar 39 and forming a notch area 259 therebetween of reduced diameter. The collar 257 may have opposed, flattened outer edges 253 of the collar 257 facilitating the tightening of the mounting bar 39 into the threaded bore 27 by a wrench. The mounting bar 39 is generally circular in cross section.

The mounting fixture 21 may include a support tube 258 having a cylindrical bore 263 with an inner diameter substantially equal to the outer diameter of the bushing 256 and collar 257 so that these elements may interconnect. The bushing 256 and collar 257 may rotate within the cylindrical bore 263 to the desired alignment. After alignment, the cylindrical bore 263 receives the mounting bar 39, the mounting fixture 21 to be retained on the mounting bar 39 on a first end 260 by means of threaded axial holes 261 receiving set screws 262, thumb screws, or the like, the latter that may be tightened against the notch area 259 to provide compression force between the mounting fixture 21 and the mounting bar 39 and prevent rotational movement 264 therebetween, and may be loosened to allow rotational movement 264 about an axis 266 of the support tube 258 of the mounting bar 39. In this way the mounting fixture 21 may be positioned rotationally so that the picatinny rail 31a-31c is oriented in the upwardly facing position to support the reel housing 23 such that the lever 35 of the reel housing 23 is aligned with the user's fingers when the reel housing 23 is coupled to the mounting fixture 21 and the user 33 is holding the grip 16 (see also FIG. 1).

Referring now to FIGS. 3 and 4, the support tube 258 of the mounting fixture 21 may have an inner diameter at a second end 267, opposite the first end 260, receiving the guide arm 164. The guide arm 164 may extend forwardly from the mounting fixture 21 stationary with respect to the bowfishing reel 20 by means of a bore 268 having a hexagonal cross section extending along the mounting fixture 21 at the second end 267. The guide arm 164 may include a corresponding insertion end 270 having a hexagonal cross section received by the corresponding bore 268 of the mounting fixture 21 and preventing rotational movement 272 therebetween by means of locking alignment of the insertion end 270 of the guide arm 164 and the bore 268. In this way, the guide arm 164 can be locked in rotational alignment such that the guide arm 164 extends from the bore along the axis 266 and is further bent upwardly at joint 168 to intersect payout axis 19 and an opening 166 of the guide arm 164 is generally aligned along payout axis 19 (see also FIG. 1).

It is understood that the insertion end 270 of the guide arm 164 and corresponding hex bore 268 may be replaced with other keyed alignments so as to lock the rotational alignment therebetween. For example, the keyed alignment may include a sunk key, parallel key, Woodruff key, tapered key, key seating by broaching, bore with triangle cross section, and the like. It is understood that the key of the guide arm 164 corresponds with a keyway or keyseat of the bore 268 to prevent relative rotation between the guide arm 164 and the bore 268. The keyed alignment may allow for rotational alignment of the reel 20, the respective picatinny rail 31*a*-31*c*, and the guide arm 164 so that the opening 166 of the guide arm is generally aligned along payout axis 19. For example, it may be desired for an upper surface of one of the picatinny rails 31*a*-31*c* to be parallel with arrow axis 19'.

Referring to FIGS. 3 and 4, the support tube 258 of the mounting fixture 21 will further support a locking lever 200 at the second end 267 of the support tube 258 operated by a user to rotate the locking lever 200 along rotation arrow 274 about an axis 216 perpendicular to the axis 266 of the support tube 258 of the mounting bar 39. The locking lever 200 is positioned on a downwardly facing end 204 of the mounting fixture 21 opposite the upwardly facing end 206 of the mounting of the picatinny rail 31*a*-31*c* and engaging with the guide arm 164 to lock in a longitudinal positioning of the guide arm 164 along the axis 266 of the support tube 258. The mounting fixture 21 includes a lever cavity 202 on the downwardly facing end 204 which extends along the bore 268 to the second end 267 to receive the locking lever 200 therein as further described below. It is understood that the locking lever 200 and lever cavity 202 may be positioned on any side of the mounting fixture 21, for example, top, left and right sides, to engage notches on different sides of the guide arm 164, for example, top, left and right sides, as further discussed below. In one embodiment, the locking lever 200 extends outwardly from the left or right side of the mounting fixture 21 and thus may pivot rearwardly to extend along the left or right side of the mounting fixture 21 in a locking position. In another embodiment, the locking lever 200 extends from a top side of the mounting fixture 21 and thus may pivot rearwardly to extend along the top side of the mounting fixture 21 in a locking position.

The guide arm 164 includes a plurality of wave shaped notches 210 (wave shaped when viewed from a side of the guide arm 164 along axis 266) on a downwardly facing side of the insertion end 270 of the guide arm 164 opposite the upward bend of the joint 168 of the guide arm 164. The wave shaped notches 210 provide a semicircular profile along the axis 266 of the support tube 258. The wave shaped notches 210 may be replaced with notches of any shape (e.g., V-shaped, U-shaped, square-shaped, rectangular-shaped, circular-shaped, etc.) and size which provide indentations that can be used to receive and secure a mating protrusion of the locking lever 200. The plurality of wave shaped notches 210 extend along the insertion end 270 for a length that is approximately a depth of the receiving bore 268 or at least extends most of the depth of the receiving bore 268. The wave shaped notches 210 may be positioned on a downwardly facing side of the guide arm 164, for example, on one side of the hex tube of the insertion end 270, that is positioned along the downwardly facing end 204 of the mounting fixture 21. It is understood, however, that the wave shaped notches 210, may be positioned on any side or multiple sides of the guide arm 164, for example, top, left and right sides, which is correspondingly positioned along a side of the mounting fixture 21, for example, top, left and right sides. Thus, when the locking lever 200 is positioned along the top, left, or right side of the mounting fixture 21, the locking lever 200 can engage the wave shaped notches 210 of the guide arm 164. The guide arm 164 may contain notches on multiple sides to accommodate any position of the locking lever 200.

The locking lever 200 provides a rotation end 212 opposite a grip end 218. The rotation end 212 provides a bore 214 extending along the rotational axis 216 of the locking lever 200 and rotating about the rotation end 212.

The grip end 218 provides a planar surface 220 extending toward the cavity 202 of the mounting fixture 21, with the planar surface 220 positioned flush against the mounting fixture 21 in an engaged position. The planar surface 220 is opposite an outwardly flared surface 222 flared away from the planar surface 220 to assist the user with gripping the grip end 218 and rotate the guide arm 164, for example, approximately 90 degrees about the rotational axis 216 between the engaged and a disengaged position.

The rotation end 212 of the locking lever 200 is a substantially cylindrical knob that is oblong in shape and having outwardly exposed flattened surfaces 224 opposite rounded surfaces 226 which are positioned to engage or disengage the guide arm 164 when rotated about the rotational axis 216 as further discussed below. The grip end 218 extends from one of the flattened surfaces 224 so that the other flattened surface 224 is positioned opposite the grip end 218.

During use, the insertion end 270 of the guide arm 164 is inserted into the bore 268 with the wave shaped notches 210 oriented downwardly toward the locking lever 200. In a disengaged position, the grip end 218 of the locking lever 200 is oriented downwardly such that one of the flattened surfaces 224 of the rotation end 212 is oriented upwardly toward the inserted guide arm 164 so that the flattened surface 224 does not contact or engage with the plurality of wave shaped notches 210 of the guide arm 164 and therefore the guide arm 164 bypasses the plurality of wave shaped notches 210 and is still slidable along the bore 268 along the axis 266 of the support tube 258. The user may choose a desired discrete longitudinal position of the guide arm 164 along the axis 266 so that a desired distance between the reel and guide arm 164 is provided as discussed below.

In an engaged position, the grip end 218 of the locking lever 200 is rotated rearwardly as seen by arrow 274 to be oriented along the mounting fixture 21 such that a rounded surface 226 of the rotation end 212 is rotated upwardly toward the inserted guide arm 164 so that the rounded surface 226 protrudes upwardly to contact and engage one of the plurality of wave shaped notches 210 in a mating configuration and therefore securely locks the rotation end 212 with respect to the waved shaped notches 210 and prevents further movement of the guide arm 164 along the bore 268 along the axis 266. The curvature of the rounded surface 226 is approximately equal to the curvature of the wave shaped notches 210 along the axis 266 so that the mating surfaces can interlock. A radius of curvature (extending along axis 266) and width (perpendicular to axis 266) of the rounded surface 226 of the rotation end 212 of the locking lever 200 may be at least as long and wide as each of the plurality of wave shaped notches 210 so that the rounded surface 226 of the rotation end 212 and be securely received within the wave shaped notches 210.

It is understood that each of the plurality of waved shaped notches 210 provides discrete "catch points" that can engage with the rounded surface 226 of the rotation end 212 which allows for a plurality of longitudinally fixed positions of the guide arm 164 along the bore 268. The waved shaped notches 210 further provides stability of the guide arm 165 by mating the notches 210 with the corresponding shape of the rounded surface 226 of the rotation end 212 of the guide arm 164 in a "hinge joint" or "pivot joint" type connection.

In this respect, the support tube 258 does not need thumbscrews or the like to tighten and secure the guide arm 164 to the mounting fixture 21 and the rotating locking lever 200 serves to prevent telescoping movement of the guide arm 164 along the axis 266 and retains the guide arm 164 within the bore 268. The plurality of waved shaped notches 210 and the hexagonal cross section of the insertion end 270 of the guide arm 164 are used simultaneously to fix the position of the opening 166 of the guide arm 164 as desired.

It is understood that in use, for example, in the field, the guide arm 164 may be rotated such that the guide arm 164 bends forwardly and upwardly from the bore 268 and so that the opening 166 is aligned with the payout axis 19, the bore 268 assisting with rotational alignment of the guide arm 164 in a desired position. The guide arm 164 may also be adjusted longitudinally within the bore 268 along the axis 266 to change a distance between the front and rear fishing line deflectors 56 and 60 and the opening 166 of the guide arm 164 as further described below. In this respect, the distance between the front and rear fishing line deflectors 56 and 60 and the opening 166 of the guide arm 164 may be varied from 1 inch to 3 inches.

The three picatinny rails 31a-31c of varying heights may be interchanged on the mounting fixture 21 and are supported by the lower clamp jaws 26 of the reel housing 23 by means of threaded bores 279 extending through the picatinny rails 31a-31c and the mounting fixture 21. The mounting fixture 21, picatinny rails 31a-31c, and lower clamp jaws 26 may be as generally described in U.S. Pat. No. 10,091,977, assigned to the applicant of the present application, and hereby incorporated by reference.

It is understood that in use, for example, in the field, the desired picatinny rail 31a-31c may be chosen to elevate or lower the height of the reel housing 23, for example, according to the size of the user's hand. The desired picatinny rail 31a-31b may be attached to the upper surface of the mounting fixture 21 in the upward facing position to accommodate a different user using the same bowfishing bow 10. The reel housing 23 may also be moved forward or backward with respect to the lower clamp jaws 26 or with respect to the mounting fixture 21 without adjusting the position of the mounting fixture 21.

Referring again to FIGS. 1 and 2, the reel cowling 36 may provide for a front opening diameter 160 through which the line 22 may pass that is substantially equal to the outside diameter of the line deflectors 56 and 60 forming a front rim of the spool 52. The front opening diameter 160 is preferably equal to the outside diameter of the line deflectors 56 and 60 (plus or minus 10 percent) and generally greater than 1.5 inches or greater than two inches and preferably equal to substantially at least 2.5 inches. The diameter 160 may be at least 50 percent of the outside diameter 163 of the cowling 36 or greater than 80 percent of this outside diameter 163 which may be substantially three inches in diameter.

The guide arm 164 may extend forwardly from the mounting fixture 21 stationary with respect to the bowfishing reel 20 during use and bend upwardly to intersect the payout axis 19. At that intersection, the guide arm 164 may have the opening 166 generally aligned along payout axis 19 with the shaft 80 of the reel 20. The opening 166 is displaced forwardly from the reel 20 such that when the line 22 is pulled tight through the opening 166 and against an outer periphery of the line deflector 60, the line is free from contact with the cowling 36.

When the line 22 extends from the opening 166 forwardly along payout axis 19 and is pulled tight, it has a deflection before and after opening 166 that subtends an angle 170 greater than 135 degrees and preferably substantially equal to 155 degrees. A corresponding angle of deflection occurs as the line 22 passes over the edge of the line deflector 60 from a line trajectory generally parallel to payout axis 19 to a trajectory deflected inwardly toward the opening 166. The deflection angle is an angle of less than or equal to 180 degrees measured in the plane of deflection.

Figures 5A, 5B:
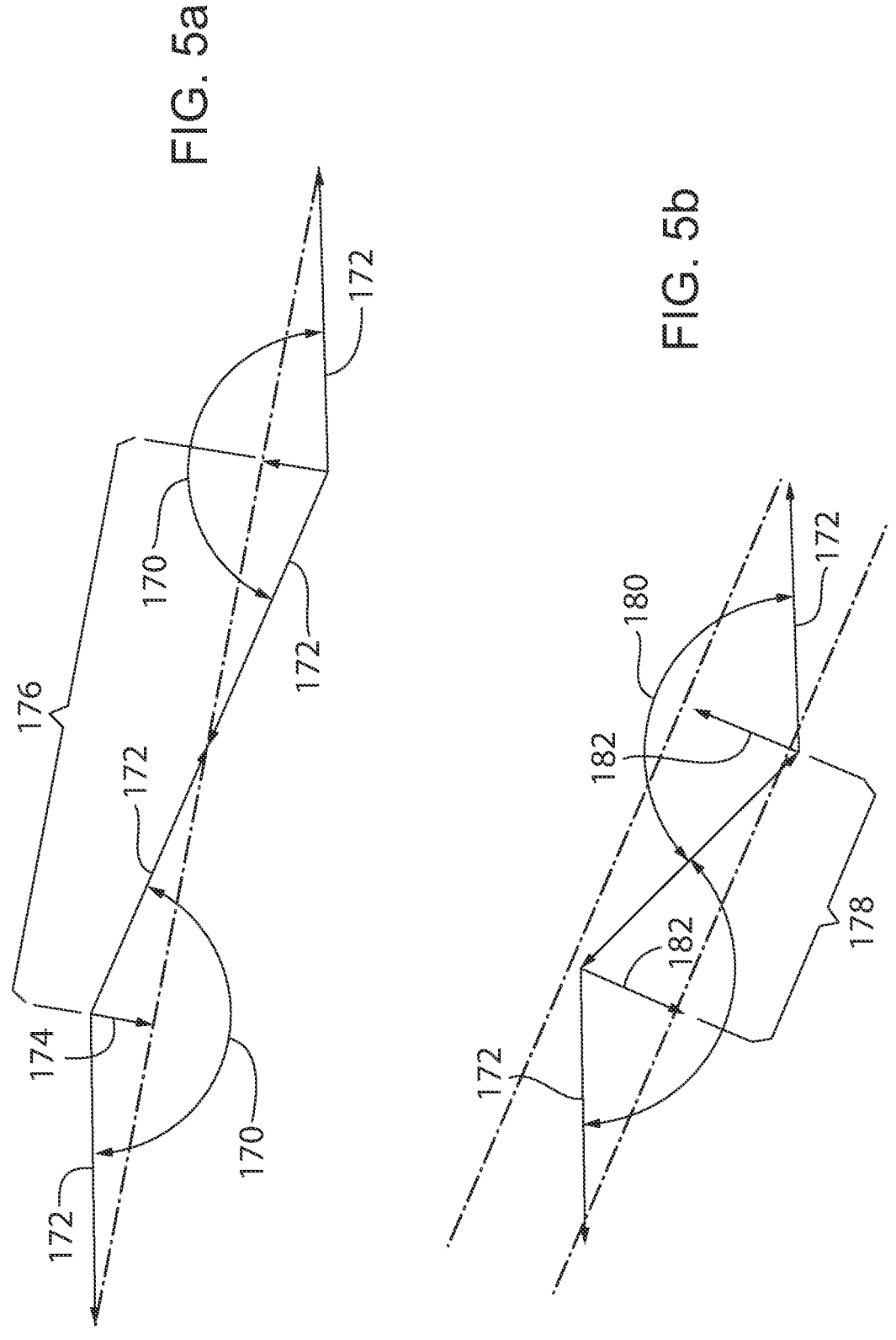
FIGS. 5a and 5b are vector force diagrams showing the reduced cross axial and hence frictional forces provided by the arrangement of FIG. 1.

Referring now also to FIGS. 5a and 5b, by making these subtended angles 170 closer to 180 degrees, the normal force of the line 22 on the opening 166 or edge of the line deflector 60 is reduced reducing friction. For given opposed tension forces 172 directed along the line 22, a reduced cross axial normal force 174 is produced. The cross axial force 174 is relevant (generally proportional) to the frictional force of contact between the line 22 and the opening 166 or against the line deflector 60 as illustrated by vector decomposition of these forces in this figure. The large angle 170 is promoted by increasing the distance 176 between the last point of contact between the line 22 and the line deflector 60 and a point of contact between the line 22 and the opening 166 as shown in FIG. 5a when compared to the typical separation distance 178 between the last point of contact between the line 22 and the line deflector 60 and the edge of the cowling 36 as shown in FIG. 5b. This latter distance 178 occurs in reels where the line 22 is constrained by an opening in the cowling 36. In this latter case, much smaller subtended angles 180 are provided at the deflection points of the line 22 causing much higher cross axial forces 182 greatly increasing frictional contact between the line and its guiding members of the line deflector 60 and opening 166. These smaller angles 180 also place higher forces on the cowling 36 such as may deform the cowling 36 or require that it be made of heavier material undesirable to the extent that it increases the overall weight of the bow.

In contrast, the reduced deflection of the line 22 shown in FIG. 1 provides reduced frictional normal force. By increasing the distance 176 between the last point of contact between the line 22 and the line deflector 60 and a point of contact between the line 22 and the opening 166 by moving the guide arm 164 outwardly from the bore 268 along axis 266, there is a reduced frictional normal force. In one example, the distance 176 between the last point of contact between the line 22 and the line deflector 60 and a point of contact between the line 22 and the opening 166 is at least 1 inch and may be at least 1.25 inches and at least 1.5 inches and at least 1.75 inches and at least 2 inches.

The construction of the present invention allows it to be sold with the mounting fixture 21 alone for attachment to a pre-existing bowfishing bow 10, or as a kit with the mounting fixture 21 being sold with the fishing line reel 20 and/or additional bowfishing accessories such as the guide arm 164 to be attached to a pre-existing bowfishing bow 10.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A fishing line reel providing rapid line payout comprising:
    a frame adapted for attachment to a bow;
    a line spool rotatable with respect to the frame about a first axis to wind fishing line on the line spool around the first axis;
    a winder having a crank arm rotatable by a user to rotate the line spool around the first axis;
    a cowling supported by the frame and surrounding the line spool, the cowling having an opening at a first end to allow payout of the fishing line along the first axis; and
    a guide arm supported by the frame and having a portion extending beyond the opening of the cowling along the first axis to receive the fishing line therethrough guiding the fishing line to prevent contact between the opening and the fishing line when the fishing line is in tension;
    wherein the guide arm is notched at discrete locations along the guide arm to provide discrete notches engaging with a corresponding lever of the frame locking a longitudinal position of the guide arm along the first axis.

2. The fishing line reel of claim 1 wherein the notches of the guide arm are wave shaped.

3. The fishing line reel of claim 1 wherein the notches are on at least a lower side of the guide arm opposite an upward bend of the guide arm extending beyond the opening of the cowling.

4. The fishing line reel of claim 1 wherein the corresponding lever extends downwardly from the frame perpendicular to the first axis in a first position and extends along the first axis in a second position locking the longitudinal position of the guide arm along the first axis.

5. The fishing line reel of claim 1 wherein the corresponding lever has a surface disengaged with the notches of the guide arm in a first position and engaged with the notches of the guide arm in a second position locking the longitudinal position of the guide arm along the first axis.

6. The fishing line reel of claim 5 wherein the surface is a concave surface corresponding to a convex shape of the notches of the guide arm.

7. The fishing line reel of claim 1 wherein the guide arm is lockable at multiple longitudinal positions along the first axis to be displaced at multiple longitudinal positions away from the frame.

8. The fishing line reel of claim 1 wherein the notches are in a continuous repeating pattern along a length of the guide arm.

9. The fishing line reel of claim 1 wherein the guide arm receives the fishing line through an aperture in a distal end of the guide arm removed from the frame and aligned with the first axis and the aperture is adjustably removed from the frame by a distance between 1 inch and 3 inches.

10. A mounting assembly for attaching a fishing reel to a bow comprising:
    a mounting fixture providing a first axial bore at a first end and a mounting surface adapted to receive the fishing reel providing an opening at a front end to allow pay out of fishing line forwardly of the opening;
    a bar adapted to attach to the bow to extend from the bow along an extension axis to be received within the first axial bore; and
    a guide arm supported by the mounting fixture, the guide arm having a proximal end extending forwardly from the mounting fixture generally parallel to the extension axis and a distal end extending forwardly from the mounting fixture and bent away from the extension axis to be displaced away from the mounting fixture and aligned with the opening of the fishing reel
    wherein the guide arm is notched at discrete locations along the guide arm to provide discrete notches engaging with a corresponding lever of the mounting fixture locking a longitudinal position of the guide arm along the first axis.

11. The mounting assembly of claim 10 wherein the notches of the guide arm are wave shaped.

12. The mounting assembly of claim 10 wherein the corresponding lever of the frame engages a lower side of the guide arm opposite an upward bend of the guide arm displaced away from the mounting fixture and aligned with the opening of the fishing reel.

13. The mounting assembly of claim 10 wherein the guide arm includes a key receivable within a corresponding keyway of the mounting fixture.

14. The mounting assembly of claim 13 wherein the key is a hex key and the mounting fixture is a bore with a hexagonal cross section.

15. A guide arm for a fishing reel providing rapid line payout comprising:
    a guide arm supported by a mounting fixture providing a first axial bore at a first end adapted to receive a bar attaching a bow and a mounting surface adapted to receive the fishing reel providing an opening at a front end to allow pay out of fishing line forwardly of the opening along a payout axis, the guide arm having a proximal end extending forwardly from the mounting fixture generally parallel to the payout axis and a distal end extending forwardly from the mounting fixture and bent away from an extension axis to be displaced away from the mounting fixture and aligned with the opening of the fishing reel wherein the guide arm is notched at discrete locations along the guide arm to provide discrete notches engaging with the mounting fixture locking a longitudinal position of the guide arm along the first axis.

16. The guide arm of claim 15 wherein the notches of the guide arm are wave shaped.

17. The guide arm of claim 15 wherein the notches are on at least a lower side of the guide arm opposite an upward bend of the guide arm extending beyond the opening of a cowling.

18. The guide arm of claim 15 wherein the guide arm includes a key receivable within a corresponding key way of the mounting fixture.

19. The guide arm of claim 18 wherein the key is a hex key.

20. A fishing line reel providing rapid line payout comprising:

a housing supporting:

a line spool rotatable about an axis;

a winder having a crank arm operable by a user for rotating the line spool with respect to the housing about the axis;

a line guide for catching a fishing line so that the fishing line winds about the line spool with rotation of the crank arm when the line guide is in an extended position and for freeing the fishing line so that the fishing line does not wind about the line spool with the rotation of the crank arm when the line guide is in a retracted position;

a handle projecting outwardly in an upward direction from an upper surface of the rear of the housing substantially perpendicular to the axis and operable by the user to move the line guide from the retracted position to the extended position when the handle moves between a released position and an actuated position; and a bias spring biasing the handle mechanism to move the line guide to the released position.

\* \* \* \* \*